United States Patent Office 2,743,048
Patented Apr. 24, 1956

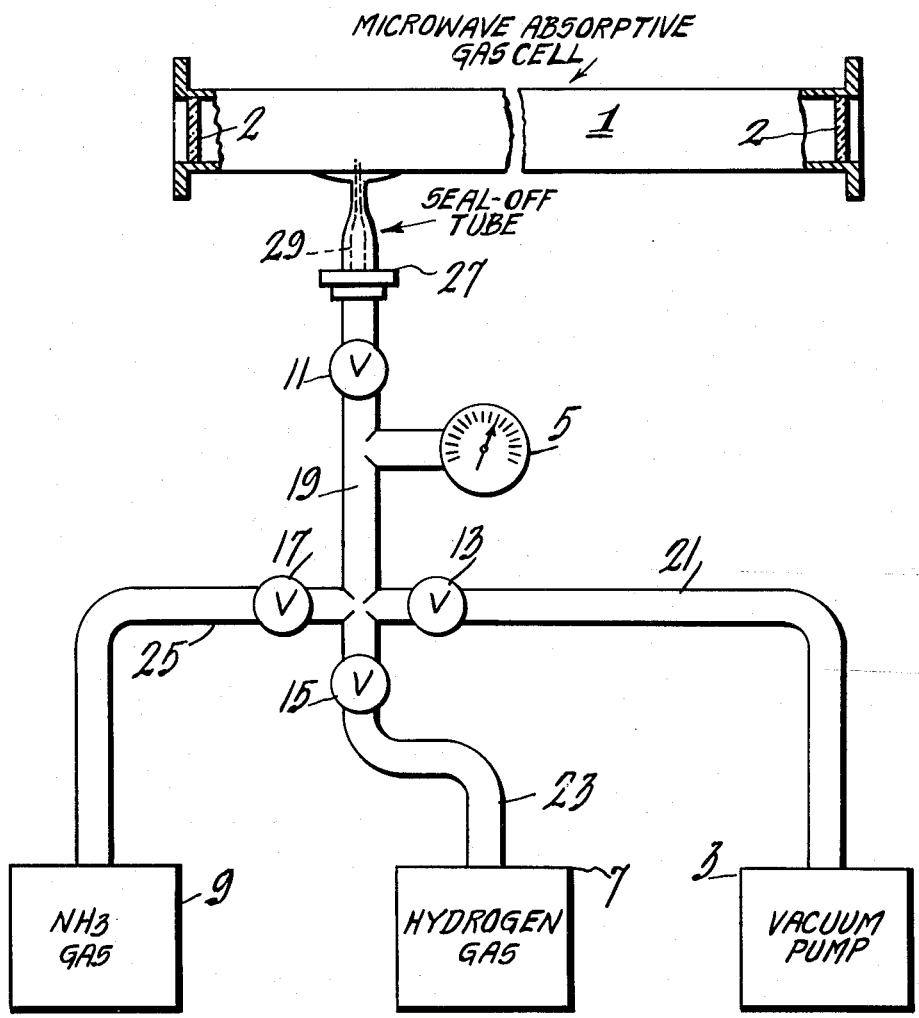

2,743,048

METHOD OF CHARGING A SEALED MICROWAVE ABSORPTIVE GAS CELL

George Washington Leck, Princeton Junction, N. J., and William Delmar Hershberger, Los Angeles, Calif., assignors to Radio Corporation of America, a corporation of Delaware Application November 29, 1950, Serial No. 198,103

5 Claims. (Cl. 226—20.1)

This invention relates generally to frequency stabilization of microwave generators, and more particularly to the preparation of a sealed cell for maintenance of a microwave absorptive resonant gas at a constant partial pressure.

Maintenance of a constant partial pressure in a sealed cell containing a microwave absorptive gas is necessary since differential gas pressure changes affect the quantity of microwave energy absorbed. These pressure variations cause a frequency control system for microwave generators to be insensitive to small variations in frequency. Such microwave absorptive gas molecules are absorbed by the porous structure of the cell walls and other such molecules are adsorbed to these walls. Chemical reactions occur between the microwave absorptive molecules and unknown elements existing in the gas cell, these reactions further reducing the number of resonant gas molecules available to absorb microwave energy for frequency control purposes. Loss of these microwave absorbing gas molecules will affect the pressure in the sealed cell especially at low pressures, since the number of molecules existing in the cell at the operating pressure, which normally is less than $10^{-1}$ mm. of Hg, is much smaller than the number of molecules existing in the cell at atmospheric pressure.

Attempts have been made to reduce pressure variations in the sealed gas cell by coating the walls of the cell with materials having reduced absorption-adsorption characteristics. Loss of electromagnetic energy in these materials is so great that the microwave energy traveling through the gas cell is too greatly attenuated before this energy had traversed a fraction of the cell's length. A material most satisfactory for the cell walls is stainless steel. This material conducts electromagnetic energy well and its absorption-adsorption characteristic is reasonably good.

The object of this invention is to provide an improved method for maintenance of a constant partial pressure in a sealed cell.

Another object of this invention is to maintain a gas at a constant partial pressure in a sealed cell when the gas is subject to absorption by or adsorption to the sealed cell walls.

According to the instant invention, the partial pressure of the sealed cell is maintained constant by introducing a gas of a different molecular structure into the cell preferably through an aperture, located at a point of maximum voltage in the guide, of cut-off dimensions for the operating frequency. This new gas will be absorbed by and adsorbed to the cell walls, freeing the microwave absorptive gas molecules that would normally be absorbed and adsorbed so that they may absorb microwave energy.

The invention will be described in greater detail with the reference to the accompanying drawing wherein the single figure is a schematic diagram of the apparatus used in the preparation of the sealed gas cell.

The sealed gas cell 1 comprises a length of microwave conductive waveguide that is sealed off at each end by a pair of gas-tight windows 2, 2. These gas-tight windows 2, 2 are permeable to microwave transmission. Apparatus for preparing the sealed gas cell 1 comprises a vacuum pump 3 for adjusting the pressure of the gas cell to a proper value; a pressure gauge 5 for observing this pressure, a storage reservoir 7 containing gas to be absorbed and adsorbed by the sealed cell walls (hydrogen for example); another reservoir 9 containing a microwave absorptive resonant gas such as ammonia; a group of valves 11, 13, 15, 17, to control gas flow; and a conduit system 19, 21, 23, 25 connecting the sealed cell 1 to the rest of the system.

The sealed gas cell 1 preferably is heated in an oven for a sufficient time to clean the cell of water vapor and varied impurities residing therein. A main control valve 11 and vacuum pump valve 13 are opened and the vacuum pump 3 removes the undesirable elements from the sealed cell 1.

The vacuum pump control valve 13 then is closed and a valve 15 to the hydrogen storage reservoir 7 is opened. Hydrogen passes from the storage reservoir 7 at a pressure in excess of that at which the sealed cell is to finally operate, through the hydrogen control valve 15, thru the main control valve 11 and into the sealed cell 1. Sufficient hydrogen is introduced into the cell 1 to saturate the walls, then the hydrogen control valve 15 is closed. After a period of time sufficient for the walls of the cell to adsorb and absorb the hydrogen molecules, an ammonia gas control valve 17 is opened and ammonia gas, or other desired microwave absorptive gas, flows from the storage reservoir 9 into the sealed cell 1. The ammonia control valve 17 then is closed. The vacuum pump control valve 13 then is opened and the vacuum pump 3 adjusts the presssure in the sealed cell 1 to its final operating value of the order of $10^{-1}$ to $10^{-4}$ mm. of Hg, as observed by a pressure gauge 5. The vacuum pump control valve 13 and the main control valve 11 then are closed. The closing of the main control valve 11 isolates physically the sealed cell 1 from the rest of the system, and if desired the cell 1 may be removed at the joint 27 by means of a seal-off tube 29 and incorporated in the frequency control system.

While ammonia gas has been described as the microwave absorptive resonant gas employed, numerous other such gases may be utilized. Some of these resonant gases are listed in the RCA Review, vol. IX, No. 1 (March, 1948), at page 40 and include carbonyl sulfide, methyl alcohol, methylamine, and sulfur dioxide. Also, the gases reducing adsorption, absorption, and chemical reaction within the cell may be any of the inert gases. Such gases include helium, neon, and argon and are listed at page 474 of the Handbook of Physics and Chemistry (13th edition, published by the Chemical Rubber Publishing Company in 1928).

We claim as our invention:

1. A method for preparing a sealed gas cell to maintain a microwave absorptive resonant gas at a constant partial pressure in said gas cell comprising evacuating said cell of undesirable elements, introducing a gas into said sealed cell other than said absorptive gas and inert with respect thereto, said other gas reducing the effects of absorption and adsorption on said resonant gas, introducing the microwave absorptive resonant gas into said sealed cell, and reducing the pressure of said cell to a final operating value not greater than $10^{-1}$ millimeters of mercury.

2. A method for preparing a sealed gas cell to maintain a microwave absorptive resonant gas at a constant partial pressure in said gas cell comprising cleaning said sealed cell, evacuating said cell of undesirable elements, introducing a gas into said sealed cell other than said absorptive gas and inert with respect thereto, said other gas reducing the effects of absorption and adsorption on said resonant gas, introducing the microwave absorptive resonant gas into said sealed cell, and reducing the pressure of said cell to a final operating value not greater than $10^{-1}$ millimeters of mercury.

3. A method in accordance with claim 2 including heating said sealed cell prior to said evacuation of said cell.

4. A method for preparing a sealed cell to maintain a microwave absorptive resonant gas at a constant partial pressure in said gas cell comprising evacuating said cell of undesirable elements, introducing a gas into said cell which has a low molecular weight compared with the molecular weight of said microwave absorptive gas and is inert with respect thereto, said gas reducing the effects of absorption and adsorption on said resonant gas, introducing said microwave absorptive resonant gas into said sealed cell, and reducing the pressure of said cell to a final operating value not greater than $10^{-1}$ millimeters of mercury.

5. A method for preparing a sealed gas cell to maintain a microwave absorptive resonant gas at a constant partial pressure in said gas cell comprising evacuating said cell of undesirable elements, introducing hydrogen gas into said sealed cell, introducing said microwave absorptive resonant gas into said sealed cell, and reducing the pressure of said cell to a final operating value not greater than $10^{-1}$ millimeters of mercury.

References Cited in the file of this patent

UNITED STATES PATENTS

| | | |
|---|---|---|
| 1,565,579 | MacRae | Dec. 15, 1925 |
| 1,709,858 | Lebrun | Apr. 23, 1929 |
| 1,951,142 | Foulke | Mar. 13, 1934 |
| 2,265,756 | Boersch | Dec. 9, 1941 |
| 2,284,899 | Hedin | June 2, 1942 |
| 2,427,098 | Keizer | Sept. 9, 1947 |
| 2,449,166 | Hershberger | Sept. 14, 1948 |
| 2,483,768 | Hershberger | Oct. 4, 1949 |
| 2,483,818 | Evans | Oct. 4, 1949 |
| 2,483,829 | Hershberger | Oct. 4, 1949 |